Figure 1:
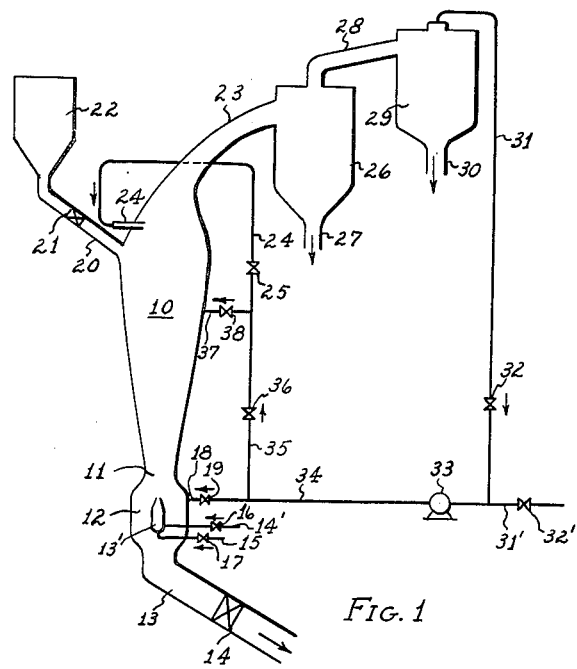

Dec. 9, 1952     G. STECKER     2,621,034

APPARATUS FOR EXPANDING MINERALS

Filed July 1, 1947

INVENTOR.
GLENROY STECKER
BY *Lee J. Gary*
ATTORNEY

Patented Dec. 9, 1952

2,621,034

UNITED STATES PATENT OFFICE 2,621,034

APPARATUS FOR EXPANDING MINERALS

Glenroy Stecker, Morton Grove, Ill., assignor to Great Lakes Carbon Corporation, Morton Grove, Ill., a corporation of Delaware Application July 1, 1947, Serial No. 758,375

1 Claim. (Cl. 263—21)

This invention relates to a process and apparatus for expanding expandable minerals such as perlite. More particularly it relates to a process and apparatus wherein falling particles of unexpanded mineral come in contact with rising heated gases and increase in temperature as they fall until expansion occurs and are then swept into a zone of lower temperature and removed from the system.

Certain minerals have the property of expanding upon being heated at a relatively high temperature and comparatively rapidly. Among these are certain types of natural minerals such as volcanic glasses herein referred to as perlitic minerals and among which are included perlite, pumicite, and tuffs comprising naturally consolidated volcanic ash. These materials contain water of constitution or bound water as distinguished from water which may be adsorbed on the outside surfaces of the mineral particles. The bound water is incorporated throughout the solid material. Certain gases such as carbon dioxide may also be dissolved in these solid materials. As a consequence, when they are rapidly heated to a point at which the mineral begins to soften, the water and other vapors are converted into gas which exerts an internal pressure causing the mineral to expand into a vesiculated or cell-like structure comprising one or more minute cells or bubbles. Due to the fact that some of these bubbles burst during formation or may be broken in subsequent handling, the expanded material also contains a certain amount of bubbles which are open at one or more points as well as curvilinear plates or fragments known as shatter material.

Certain other types of minerals can also be expanded including vermiculite and some clay-like minerals. The character of expansion in the case of vermiculite is somewhat different than in the case of perlite. Instead of forming open and closed bubbles or voids, the expansion of vermiculite is single dimensional due to its crystalline lamellar structure being forced apart by the warping effect of heating on its crystalline planes aided by the action of water vapor released between the lamellae. Even on slow prolonged heating allowing water to diffuse out, vermiculite will expand due to the warping and twisting of its planes by heat. The expanded vermiculite resembles a cluster or clump of thin small planes stacked one upon the other spaced slightly apart but weakly bonded together.

The expansion of perlite, a non crystalline material, must be carried out rapidly before the bound water can diffuse from the particles. If heated too slowly up to the expansion temperature, the particles expand but little or not at all. If heated too rapidly, the material tends to decrepitate into fines before popping or expanding, so that the expanded particles are smaller than they might otherwise be under optimum conditions. The present invention affords a process which provides optimum heating of the particles to the expansion temperature, and results in optimum expanding conditions without excessive production of fines. It also prevents overheating by removing the expanded particles immediately from the zone of highest temperature.

Vermiculite, unlike perlite, expands even after long preheating with substantial loss of water, apparently due to the warping of its planes. If the heating up of the vermiculite is too slow, the particles tend to expand first near the outside, and this insulates the interior and retards further expansion. Hence a rapid, uniform upheat or preheat is desirable and the present process provides just that. Consequently the particles can expand to the maximum at a given temperature, and expansion throughout the particles is more uniform than with other methods.

These materials may be used in insulation for example as poured or blown in insulation between the walls of buildings, refrigerators, etc., or may be used in mixtures of concrete, plaster, asphalt, etc. Because of the radically different character of the expanded materials, the materials are not necessarily exactly equivalent to one another.

The particular apparatus and methods of this invention may be used in connection with vermiculite and other expandable minerals but are especially adapted to the treatment of perlite.

In one broad embodiment, the invention comprises a process for expanding a mineral in which expanded particles of said mineral are dropped vertically countercurrent to a stream of heated gases, and removing the expanded particles at a point above that at which said unexpanded particles were dropped.

In a more specific embodiment, the invention consists in a process for expanding a mineral which comprises dropping particles of said mineral into an expansion zone countercurrent to a rising stream of heated gases, regulating the flow of said gases in the expansion zone to substantially decelerate the fall of unexpanded mineral and to carry expanded particles rapidly upward, maintaining a high velocity gas barrier against falling particles adjacent the lower end of said zone, recovering expanded mineral and removing accumulated unexpandable mineral from the expansion zone.

Figure 2:
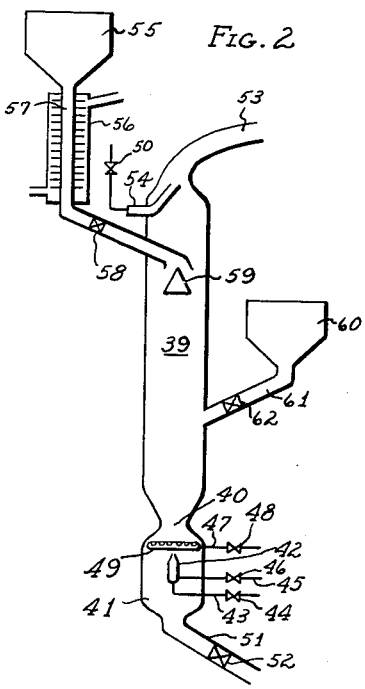
Figure 3:
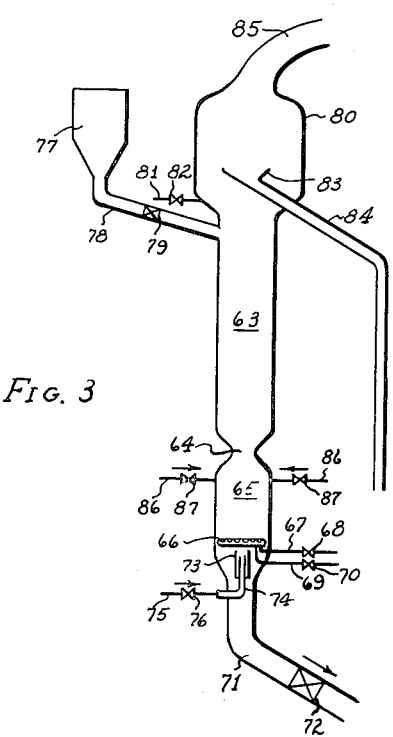

The invention may be understood by reference to the drawings which diagrammatically represent several embodiments of the invention. Figure 1 is a diagrammatic representation in elevation of one preferred form of the invention. Figure 2 is an alternative form of the invention wherein particles of different sizes may be charged at different levels and providing preheating of the coarser material before introduction into the reaction zone. Figure 3 represents another means and method for recovering expanded product from the apparatus.

Referring to Figure 1, the expansion zone is indicated at 10. This comprises the zone in which the expansion takes place and may comprise a tapered vessel which may be made of any suitable material generally of steel which may be lined with a refractory material. Alternatively, the vessel may be made of a refractory material. It must withstand comparatively high temperatures in the presence of gases containing oxygen and therefore should be resistant to oxidation. In a few of the cases the particles moving within this zone may be abrasive. The vessel should be designed to withstand abrasion and should also be so designed that there are no sharp edges or corners against which the particles impinge. Such design is required for long furnace life and to minimize the tendency to crush the particles of expanded material resulting in the formation of undesired fines.

At the lower end of the expansion zone 10 is a zone 11 of narrowest cross section. Below this point the diameter of the vessel increases to form a combustion chamber 12; leading out of the combustion chamber 12 is a duct 13 in which there is a control valve 14. Located within the combustion zone 12 is a burner 13' having an air line 14' and a fuel line 15. These lines are controlled by valves 16 and 17 respectively. Entering the combustion chamber 12 is line 18 controlled by valve 19 through which a gas such as air which may be preheated, or process gases at a suitable temperature, may be introduced into the combustion zone at a point just below the constriction 11. By this line the flow of hot gases through the constriction 11 and through the expansion zone 10, may be regulated. The gases thus introduced may be preheated, by means not shown, to any desired temperature.

Adjacent the top of the expansion zone is a line 20 containing valve 21 through which the particles of comminuted mineral may be introduced from hopper 22 into the expansion zone. Means may be provided to distribute the particles more or less uniformly throughout the cross section of zone 10.

The top of the reactor is illustrated as tapering to a duct 23. This is done to minimize abrasion and breakage of particles. An air or gas line 24 containing valve 25 is designed to inject air toward duct 23 into the outlet end of the expansion vessel above the point at which the raw mineral is introduced. The duct 23 communicates with a cyclone separator 26 which has a leg 27 through which product may be withdrawn to be collected. Leading from separator 26 is a transfer line 28 attached to another separator 29 having a leg 30 leading to a collector. A line 31 containing valve 32 connects with pump 33 and line 34 to join line 18 and line 35, the latter of which contains valve 36 whereby gas may be recycled from the separator into the combustion zone 12 or into the expansion zone 10. Air or combustion gases may be brought thru line 31 and valve 32. Line 37 containing valve 38 may be used to introduce air at a point in the expansion zone below the point at which the mineral particles are introduced. These air lines 24 and 37 not only assist in moving the expanded material from the expansion zone but also have the effect of cooling the particles and gases in the upper part of this zone, thus preventing loss of bulk volume or increase in bulk density due to overheating. This is a real advantage for the process.

In operation, perlite or other expandable mineral contained in hopper 22 passes through line 20 and valve 21 into the upper part of the expansion zone. Here the particles meet the upwardly flowing heated gases from burner 13 and line 18. The specific gas flow rate used will depend upon the particle size of the ore and its density. The rate of gas flow is chosen so that it decelerates or slows the fall of the unexpanded particles through zone 10 giving them time to become preheated to an expanding temperature while descending through the upper part of the expansion zone 10. This is particularly beneficial in the case of the larger particles.

As the particle continues to fall through zone 10, its temperature increases. As the particles approach constriction 11 which is the hottest part of the zone, the velocity of the fall decreases sharply because the velocity of the gas increases. Thus more time is allowed to heat the particle to expansion temperature. The rate of gas flow through constriction 11 is sufficient to present a gas barrier preventing the fall of particles thru the constriction. The zone 10 tapers to the constriction so that particles fall at a progressively reduced rate as they approach the constriction. It is preferred that the rate be adjusted so that so-called hindered settling of unexpanded particles may occur in the lower part of the reactor above the constriction. The gases passing through constriction 11 become in effect a gas barrier to prevent the major part of the particles undergoing expansion from dropping through into the combustion zone 12 and then on out through transfer line 13. Some particles will work thru the barrier at constriction 11, especially vagrant large sized as well as unexpanded particles of the charge. These may include particles of other minerals sometimes occurring with perlite which will not expand. As particles incapable of expanding begin to accumulate above restriction 11, they offer an obstruction to gas flow so that from time to time the particles will fall through. Most of this drop-through material is of no value as expanded material and may be discarded or used as a relatively heavy filler aggregate.

As the particles continue to be decelerated toward the hottest zone just above the constriction, they become heated to an expansion temperature at which point they suddenly expand to 5–20 times the original particle size. Because of the increased buoyancy of the expanded particles and the larger amount of surface exposed thereby, the gases passing up through constriction 11 sweep the expanded mineral particles up through the expansion zone 10 and into duct 23. Air or other gas is injected through line 24 in the upper end of expansion chamber 10, near the duct 23, and gives a boost or adds impetus to the particles so that they may be separated from the carrying gas in the cyclone separators. The gas thus introduced is preferably at a lower temperature than that of the expansion zone proper so as to cool the particles to a point below which they will tend to collapse if permitted to remain in a softened or near-fused state. In this way, the desired bulk volume and sealed void volume attained in zone 10 is saved since the tendency of the particles to fuse on further heating after expansion is overcome by their immediate removal and cooling.

Referring to Figure 2, the reaction zone is indicated generally as 39. This is shown as a cylindrical device having vertical side walls. Near the bottom of this zone is a constriction 40 between the expansion zone and the combustion zone 41. A burner 42 to which fuel is supplied through line 43 and valve 44, and air is supplied through line 45 and valve 46. A secondary air or gas line 47 containing valve 48 feeds to the distributor 49. A pipe or duct 51 containing a valve 52 leads from the bottom of combustion chamber 41. A duct 53 leads from the top of the expander and may have an air line 54 leading into it, which supplies air to serve both as a coolant and to increase the velocity of the expanded particles to air in removing them quickly from the system. A hopper 55 may be equipped with a heat exchanger 56 around the finned duct 57. In certain instances it is desirable to preheat the charging stock in order to remove occluded (not bound) water and/or gases and to prepare it for expansion. This may be done by the heat exchanger through which any heat exchange medium including part of the hot expanded material may be passed. The line 57 leads from hopper 55 through valve 58 into the interior of zone 39. A conically shaped distributing member 59 is shown whereby the perlite may be scattered evenly throughout the cross section of reactor 39.

A second hopper 60 having a duct 61 and valve 62 is provided at a point lower than that at which duct 57 enters the expansion vessel and may be used for introducing more finely divided material than is handled from hopper 55. It has been found that the very small particle sizes are more efficiently expanded at temperatures higher, (i. e. closer to the constriction 40) than are used for the coarser particles and that a shorter heating time should be used, hence the lower point of entry to zone 39 as shown. Preheating of the fine particles is usually not desired; therefore no preheater is shown. By introducing the fine material into the hotter portion of the zone substantialy instantaneous expansion occurs and the material is swept immediately upward together with the larger expanded particles and out of the system.

Thus according to procedure illustrated in Figure 2, raw material of wider mesh distribution can be satisfactorily expanded in a given plant than would otherwise be the case.

In general the crushed minerals employed in operations such as shown in Figure 1 are of a comparatively closely graded particle distribution, although particles as large or larger than 10 mesh can be handled in this apparatus. If the size is too large, the amount of gas used adds to the expense of the operation and it is, therefore, preferred to use material finer than about 10 mesh. Closely graded sizes are preferred, for example, 10 to 20 mesh, 20 to 30 mesh, 20 to 40 mesh, 30 to 50 mesh, etc. when the single point of charge introduction is used. However, by having more than one point of introduction as in Figure 2 and introducing the closely graded particle fractions at points optimum for each, an expanded product having a wide range of mesh sizes of fully expandable particles may be manufactured in a single operation. This increases the flexibility and utility of the plant. The apparatus shown in Figure 2 can be used with one hopper, or more than two hoppers and ducts therefrom may enter zone 39 at points most desirable to the mesh size of the mineral charged.

In Figure 3 is shown another embodiment. The expansion zone is generally indicated at 63. This is shown as a vertical tube. A constriction 64 between the expansion chamber 63 and combustion chamber 65 provides a means for furnishing the gas barrier and preventing the expanding and expanded particles from dropping on through into the combustion zone except as to that kind of material previously described.

In the combustion zone is a ring type of burner 66 which may be annular in shape and to which fuel may be supplied through line 67 and valve 68 and air may be supplied through line 69 and valve 70. A discard duct 71 containing valve 72 leads out of the system.

Since a comparatively small amount of coarse material may drop through the constriction 64, an eductor tube 73 having a nozzle 74 and an air line 75 and a valve 76 may be provided at the point at which the combustion zone tapers to join duct 71. Due to the eductor or ejector effect of air passed through the tube 73, some portion of the material may be picked up and shot upward through the burner into the combustion zone and carried into the expansion zone 63 where it may be expanded. The remaining coarse material which may comprise unexpanded and unexpandable particles as well as those particles which may have formed by expansion and then become fused, are withdrawn through duct 71 and may be discarded. Air or other gas may be introduced through lines 86 and valves 87 below constriction 64.

The unexpanded mineral charge is fed from hopper 77 through line 78 and valve 79 into the upper portion of the expansion tube. At the top of the expansion tube is an enlarged, velocity-reducing zone 80 into which an air line 81 having a valve 82, leads. A pick-up hopper 83 is provided in the interior of this zone 80. A line or duct 84 leads to the bag house or storage. Duct 85 may lead to the atmosphere or may lead to a cyclone separator to recover any fine material that may be carried along with it.

In operation, the mineral to be expanded is introduced from hopper 77 through line 78 and valve 79 falling downwardly through hot gases until it expands as previously described. At this point the expanded material having a substantially greater volume per unit weight than the raw charge, is blown upward into zone 80. The withdrawal hopper or funnel 83 is preferably designed so that the passage between it and the wall of zone 80 is about the same in distance as the diameter of tube 63. Also, air may be introduced through line 81 to increase the velocity so that the fine particles are in what may be termed streamlined flow as they are swept upward into zone 80, past the gathering hopper 83. In the part of zone 80 above 83, the velocity decreases substantially because of the enlarged area and the particles may tend to form a dense phase; that is, there is a 2-layer system in the zone, one of which has the appearance of a boiling liquid. Some of the particles in falling downward will drop into the hopper 83 and are carried away through the line 84 to be recovered. Some material, being very light, passes out through line 85 and, as mentioned above, may be recovered separately. The system acts to classify the lighter and heavier materials.

The operating conditions in the expansion zone of one of the above devices may vary considerably over the range of about 800° to about 1300° C. with a preferred temperature of the order of 900° to 1100° C. at the hottest point. In view of the fact that at temperatures above about 1050° C. there is a tendency for the perlite to stick to the hot surfaces upon which it impinges, it is preferred that the lowest practical temperature be employed consistent with the quality of the product desired. The temperature at the point of the constriction is roughly an average of that of the air introduced through the secondary air lines (for example at 18 in Figure 1) and the temperature of the combustion products from the burner. Thus, at just and above the constriction the temperature may be from 900° to 1100° C. and is the hottest area of the expansion zone to which the material is subjected. Higher in the tube the temperature of the gases becomes progressively lower, primarily due to the use of heat in preheating the material introduced from the hopper. Reduction of the temperature may also be made by introducing additional air at one or more points along the expansion zone. Because the temperature decreases progressively up the length of the tube, the velocity of the gases tends to decrease somewhat in the upper part of the expansion zone. This is a feature of the invention which I have found to be desirable, in treating such materials as perlite, so as to expand it at the highest practicable temperature and then to cool immediately to a temperature below which there is no substantial decrease in the bulk volume and the sealed void volume of the expanded perlite. By decreasing the rate of gas flow in the upper portion of the heated zone, it becomes possible to temper or anneal the expanded particles for a short time at a lower temperature before it is carried out of the system. This improves the strength and resistance to breakage of the expanded perlite.

The cooler air introduced into the top of the expansion vessel serves to further cool the perlite and also serves to remove it rapidly from the zone.

The pressure employed is generally atmospheric or slightly super atmospheric. As a rule there is a back pressure equal to from 1 to 5 pounds per square inch through the vessel. The time for preheating, expanding and removing the material is generally from about 10 to about 60 seconds although longer or shorter periods of time may be employed by adjusting the rates of flow of the gas and solid as well as by the design of the plant, e. g. by the length of the expansion zone.

Particles of perlite when expanded by heat generally contain some proportion of sealed voids or bubbles. I have found that by the present process, sealed void volumes are obtainable which are much higher than are obtainable by any other process. Thus a perlite from Arizona was expanded to have a sealed void volume of 2.3 cubic centimeters per gram, and an apparent bulk weight of about 6.7 pounds per cubic foot. By other methods of expansion such as in a muffle furnace the sealed void volume is considerably less, for example, of the order of 0.5 to 0.7 cubic centimeters per gram. Moreover, the bulk density of such an expanded product was in the neighborhood of about 15 to 25 pounds per cubic foot. This illustrates the substantial improvements obtained in the present type of operation.

Another advantage is that products of closely graded mesh size for special purposes can be made in the present apparatus. Such special products often command a high price.

Another advantage of this process is that it provides a way to get the particle into the hot gas, preheating it as it falls, then expanding it at the highest temperature employed and immediately getting it into a cooler zone before it has an opportunity to melt and lose its desirable properties of high sealed void volume and high bulk volume. By providing a tempering section by means of the cooler zone, the strength of the material can be improved.

Another advantage is that the use of a constriction in the bottom of the expansion tube provides a gas barrier, prevents many of the unexpanded materials from dropping out of the system and thus being lost. Many of these unexpanded particles after passing down through the heated gas would expand if properly heated. By means of the present invention these particles are kept in motion at the bottom of the heating zone until they can expand. A few of the particles of course, especially those which are denser than the charge, drop through and are either removed from the system or are returned to it in the manner described in Figure 3. There is unavoidably a certain amount of material in perlite that will not expand. Where these are present, they may accumulate in the lower part of the expansion zone. As they increase in quantity, they tend to hold up the flow of gases from the combustion zone so that eventually they drop through the combustion zone and are removed from the system. In this way the apparatus serves not only to expand the perlite particles but also as a classifier and a purifier. There is also a possibility that a few expanded particles remain in the system until they begin to fuse. These are also removed in the manner just described. The tendency to accumulate coarse material becomes greater as the range of mesh sizes widens unless handled, for example, as described in connection with Figure 2.

It is an advantage of this process that there is less tendency to break down the particles than in the case of certain other types of expanding apparatus. However, those particles which are broken down, particularly when perlite is expanded, are useful since the essential particle strength is not destroyed.

In the case of vermiculite, which cannot be crushed to smaller sizes after it has been expanded without substantially collapsing its lamellar structure, the charging stock must first be reduced to the proper sized particles before it is expanded in order to produce the desired expanded size.

The amount of shatter material produced during expansion particularly from perlite but also other minerals as well is substantially less than by other processes such as in a rotary kiln.

It should be understood that the principle of multiple point introduction of the different mesh sizes of perlite and also of air can be used with any one of the devices illustrated.

It is also understood that as many cyclone separators as may be needed can be used. Other types of separators such as electrical precipitators may be employed.

The length of time during which the particles are kept in the expansion zone, whether longer or shorter, can be governed by the length, diameter and cross sectional shape of the tube, and by suitable control of the gas inlet velocities thereto as well. The average time factor desired for the process can thus be established within optimum limits.

It is also within the scope of the invention to introduce hot gases at various points in the expansion zone to furnish auxiliary heat. The auxiliary heat may also be supplied by externally heating the expansion zone thus permitting fully independent control of gas velocities throughout the system. Further, in order to facilitate the removal of unexpanded or unexpandable particles which may accumulate just above the constriction of the apparatus, it may be desirable in some cases to provide a drawoff line or duct (not shown) through the wall thereof at this point. Another way of facilitating the removal of accumulated particles may be by means of intermittently interrupting or decreasing momentarily the gases fed the burner zone and flowing upwardly through the constriction to permit such particles to fall through the burner zone and be collected as shown. These means for removal of accumulated material are especially desirable when expanding minerals which contain relatively large amounts of unexpandable material.

The invention is not to be interpreted as limited to the exact modifications or conditions shown or described.

I claim as my invention:

An apparatus for expanding an expandable mineral comprising an expansion chamber in the form of a vertical, elongated vessel having a substantially cylindrical interior which is unobstructed so as to permit unrestricted fall of mineral through said chamber, a combustion chamber disposed below said expansion vessel, a burner disposed therein and spaced from the surrounding walls to permit unexpanded material to pass the burner, said vessel and said combustion chamber being in communicating relationship through a Venturi constriction therebetween, the axes of said expansion vessel, combustion chamber and constriction being in substantial vertical alignment; means in the combustion chamber for supplying heated gases from said combustion chamber to said expansion chamber at a rate to blow substantially all of the expanded mineral particles from the top of the expansion chamber and to form a gas barrier to prevent expanded mineral from dropping through said constriction, said means comprising a burner as the sole means for supplying heat to said expansion chamber, a means for introducing mineral to be expanded into said expansion chamber above the constriction, means for removing expanded mineral from the expansion chamber above the point of introduction of the mineral particles, and means for removing from the bottom of the combustion chamber, unexpanded particles which fall past the burner.

GLENROY STECKER.

REFERENCES CITED

The following references are of record in the file of this patent:

UNITED STATES PATENTS

| Number | Name | Date |
|---|---|---|
| 212,508 | Robinson | Feb. 18, 1879 |
| 920,334 | Hughes | May 4, 1909 |
| 2,020,431 | Osborne et al. | Nov. 12, 1935 |
| 2,139,378 | Myers et al. | Dec. 6, 1938 |
| 2,306,462 | Moorman | Dec. 29, 1942 |
| 2,409,707 | Roetheli | Oct. 22, 1946 |
| 2,421,902 | Neuschotz | June 10, 1947 |
| 2,431,884 | Neuschotz | Dec. 2, 1947 |
| 2,456,207 | McCoy | Dec. 14, 1948 |
| 2,389,399 | Alther | Nov. 20, 1949 |
| 2,572,484 | Howle et al. | Oct. 23, 1951 |

FOREIGN PATENTS

| Number | Country | Date |
|---|---|---|
| 446,045 | Great Britain | Apr. 23, 1946 |

OTHER REFERENCES

Perlite, Bureau of Mines Publication, I. C. 7364, August 1946.